United States Patent
Sheu (10) Patent No.: US 7,400,783 B2
(45) Date of Patent: Jul. 15, 2008

(54) SEGMENT BASED IMAGE REGISTRATION METHOD

(75) Inventor: Hsin-Teng Sheu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 707 days.

(21) Appl. No.: 10/952,926

(22) Filed: Sep. 30, 2004

(65) Prior Publication Data

US 2005/0157946 A1    Jul. 21, 2005

(30) Foreign Application Priority Data

Jan. 16, 2004  (TW) .............................. 93101260 A (51) Int. Cl.
*G06K 9/32* (2006.01)
*G09G 5/00* (2006.01)

(52) U.S. Cl. .................... 382/294; 382/295; 345/648; 345/649

(58) Field of Classification Search .................. 382/294
See application file for complete search history.

(56) References Cited

U.S. PATENT DOCUMENTS 6,473,517 B1 * 10/2002 Tyan et al. .................. 382/105
7,263,243 B2 *  8/2007 Chen et al. .................. 382/294

OTHER PUBLICATIONS

Coiras et al., "Segment-Based Registration Technique for Visual-Infrared Images", Optical Engineering, vol. 39, Issue 1, Jan. 2000, pp. 282-289.*
Wang et al., "Image Registration by Control Points Pairring Using the Invariant Properties of Line Segments", Pattern Recognition Lett., vol. 18, Issue 1, 1999, pp. 269-281.*

* cited by examiner

*Primary Examiner*—Jingge Wu
*Assistant Examiner*—Jose M Torres
(74) *Attorney, Agent, or Firm*—Rabin & Berdo, PC (57) ABSTRACT

An examined image is segmented, where a segment thereof may correspond to an area scan image or a line scan image of which the size is defined by considering the performance of the servo mechanism. In the segment, vectors between feature points of the examined image and a standard image are compared, and based on the required tolerance, a Fibonacci search having a predetermined number of iterations is used for matching an optimal corresponding relationship between the examined image and the standard image.

15 Claims, 7 Drawing Sheets

SEGMENT BASED IMAGE REGISTRATION METHOD

RELATED APPLICATIONS

The present application is based on, and claims priority from, Taiwan Application Serial Number 93101260, filed Jan. 16, 2004, the disclosure of which is hereby incorporated by reference herein in its entirety.

BACKGROUND

1. Field of Invention

The present invention relates to a method for registering images. More particularly, the present invention relates to a segment based image registration method, which uses the Fibonacci search.

2. Description of Related Art

Prior art mainly provides the Voronoi method and the Delaunay method for registering images.

The Voronoi method divides standard and examined images into Voronoi diagrams according to feature points thereof, forms vectors between every two adjacent feature points, and processes these features with discrete Fourier transforms to obtain vectors for every feature point. Then, the vectors of examined and standard images are compared to build similarity matrices of vector dimensions and magnitudes, and a transformation relationship between the two images is thereby derived.

The Delaunay method connects every feature point to form Delaunay triangles. Transformation relationships, such as scaling, rotation and translation, of sides of every Delaunay triangle in examined and standard images are compared to build four matrices, one of them being derived with the highest similarity, which is the optimal transformation parameter between the two images.

However, in the conventional Voronoi method, similarity matrices usually have wrong comparisons due to the deviations between the feature points. Moreover, if the line scan image segment is not large enough, the deviations are more serious, and the wrong comparisons caused thereby are increased. In the conventional Delaunay method, though the effects of the deviations between feature points are decreased, the sizes of matrices are usually quadratically enlarged with increasing image size or precision, and the enlargement greatly increases required computation time and memory space.

In engineering, computation time and memory space need to be specified, and it is hard to give considerations to both of them.

In many image registration applications, such as copper clay laminate inspections or document scans in fax machines, it is a general practice to use line scanning for image acquisition due to cost, precision, computation time, or even the construction of the entire equipment. The Voronoi and Delaunay methods often have to acquire images in segments because the sizes of images are too large, forcing the servo mechanism thereof to run and stop frequently and thus causing bad efficiency and serious errors.

In addition, in these situations, images may be twisted because of unbalanced forces of the servo mechanism, obstacles, user negligence, or variations in angles during image acquisition. The conventional machines ignore the twists in images due to lack of rectifying schemes, and cause inaccurate product and poor quality.

SUMMARY

It is therefore an objective of the present invention to provide a segment based image registration method, which derives transformation parameters between examined and standard images in segments, to enhance the accuracy of image registration, decrease required memory space, and increase the flexibility of resource allocation to shorten the computation time.

It is another objective of the present invention to provide a segment based image registration method, which derives ideal intervals for every transformation parameter with the Fibonacci search, to ensure the required precision and further decrease searching time.

In accordance with the foregoing and other objectives of the present invention, a segment based image registration method is provided for registering an examined image with a standard image. The standard image is divided into at least one standard image segment, and the examined image is divided into at least one examined image segment. The standard image segment has a plurality of standard feature points, and the examined image segment has a plurality of examined feature points.

A standard reference point is selected in the standard image segment, and an examined reference point is selected in the examined image segment. The standard feature points and the standard reference point form a plurality of standard vectors, and the examined feature points and the examined reference point form a plurality of examined vectors. After that, the examined vectors are compared with the standard vectors to obtain at least one transformation matrix. A transformation parameter is derived from the transformation matrix according to a Fibonacci search, and the examined image segment is then adjusted with the transformation parameter.

According to one preferred embodiment of the present invention, at least one transformation matrix comprises a scaling transformation matrix, a rotation transformation matrix, a first translation matrix and a second translation transformation matrix. The Fibonacci search sets a tolerance and an initial possible interval, and two ends of the initial possible interval are a maximum possible value and a minimum possible value. A Fibonacci iteration number is obtained according to the tolerance, and the initial possible interval is divided into a first interval, a second interval and a third interval with a first experimental point and a second experimental point according to the Fibonacci iteration number.

Then, numbers of elements of the transformation matrix falling into the first, second and third intervals are counted, and a sum of the numbers of the elements in the first and second intervals is compared to a sum of the numbers of the elements in the second and third intervals. The two adjacent intervals having the greater sum of the numbers of the elements are kept, and the other interval is removed. The two remaining intervals are used as a new possible interval and iteration steps are further repeated for the new possible interval until obtaining an ideal interval.

In the preferred embodiment, the initial possible interval is divided into a former interval and a later interval by a midpoint of the first experimental point and the second experimental point. The former interval comprises the first interval and one portion of the second interval, and the later interval comprises the other portion of the second interval and the third interval.

Numbers of the elements falling into the former interval and the later interval are counted. When the number of the elements in the former interval is greater than the number of the elements in the later interval, the third interval is removed; and when the number of the elements in the later interval is greater than the number of the elements in the former interval, the first interval is removed.

In addition, the numbers of the elements are counted with an accumulator, and the transformation parameter is the experimental point at the maximum value of the ideal interval.

According to another preferred embodiment of the present invention, the standard image segment and the examined image segment are divided by quantities of the feature points or distances. Moreover, when the standard image has two standard position points and the examined image has two examined position points, a midpoint of a line connected between the two standard position points is defined as the standard reference point, and a midpoint of a line connected between the two examined position points is defined as the examined reference.

According to another preferred embodiment of the present invention, when the standard image and the examined image have plural corresponding image segments, the method further divides a second standard image segment from the standard image and divides a second examined image segment from the examined image, in addition to the original first standard and examined image segments as mentioned above.

An initial boundary of the second standard image segment is decided according to one of the standard feature points in the second standard image segment closest to the first standard image segment; and an initial boundary of the second examined image segment is decided according to one of the examined feature points in the second examined image segment closest to the first examined image segment. Alternatively, a first predetermined distance is between an initial boundary of the second standard image segment and a final boundary of the first standard image segment; and a second predetermined distance is between an initial boundary of the second examined image segment and a final boundary of the first examined image segment.

In the preferred embodiment, the initial boundary of the second standard image segment is parallel to a line connected between the two standard position points; and the initial boundary of the second examined image segment is parallel to a line connected between the two examined position points.

In another aspect, the standard reference point of the second standard image segment is located on the initial boundary of the second standard image segment, and a line connected between the standard reference points of the first and second standard image segments is perpendicular to an initial boundary of the second standard image segment. The examined reference point of the second examined image segment is located on the initial boundary of the second examined image segment, and a line connected between the examined reference points of the first and second examined image segments is perpendicular to an initial boundary of the second examined image segment.

The present invention processes images in segments, and therefore the sizes of its matrices are substantially decreased compared to those of the Voronoi and Delaunay methods. The Fibonacci search is used in the present invention to iterate and search for the ideal interval, and therefore, the possible intervals used for searching are smaller than those used in the conventional methods, thus greatly decreasing the searching time.

Furthermore, the Intervals used in the present invention are not as large as those used in the conventional methods, saving tremendous memory space. In addition, the method of the present invention allows users to set numbers of iterations according to the required tolerance with the Fibonacci search, thus providing great flexibility and ensuring the required precision.

The Fibonacci search is the fastest of the interval searching methods, of which the coarse-to-fine approach enhances the reliability of the obtained transformation parameters. According to the method of the present invention, transformation parameters between the image segments of standard and examined images can be obtained with the advantages of saving memory space and decreasing computation time, and the examined image segments are adjusted well to the original standard appearance.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1A:
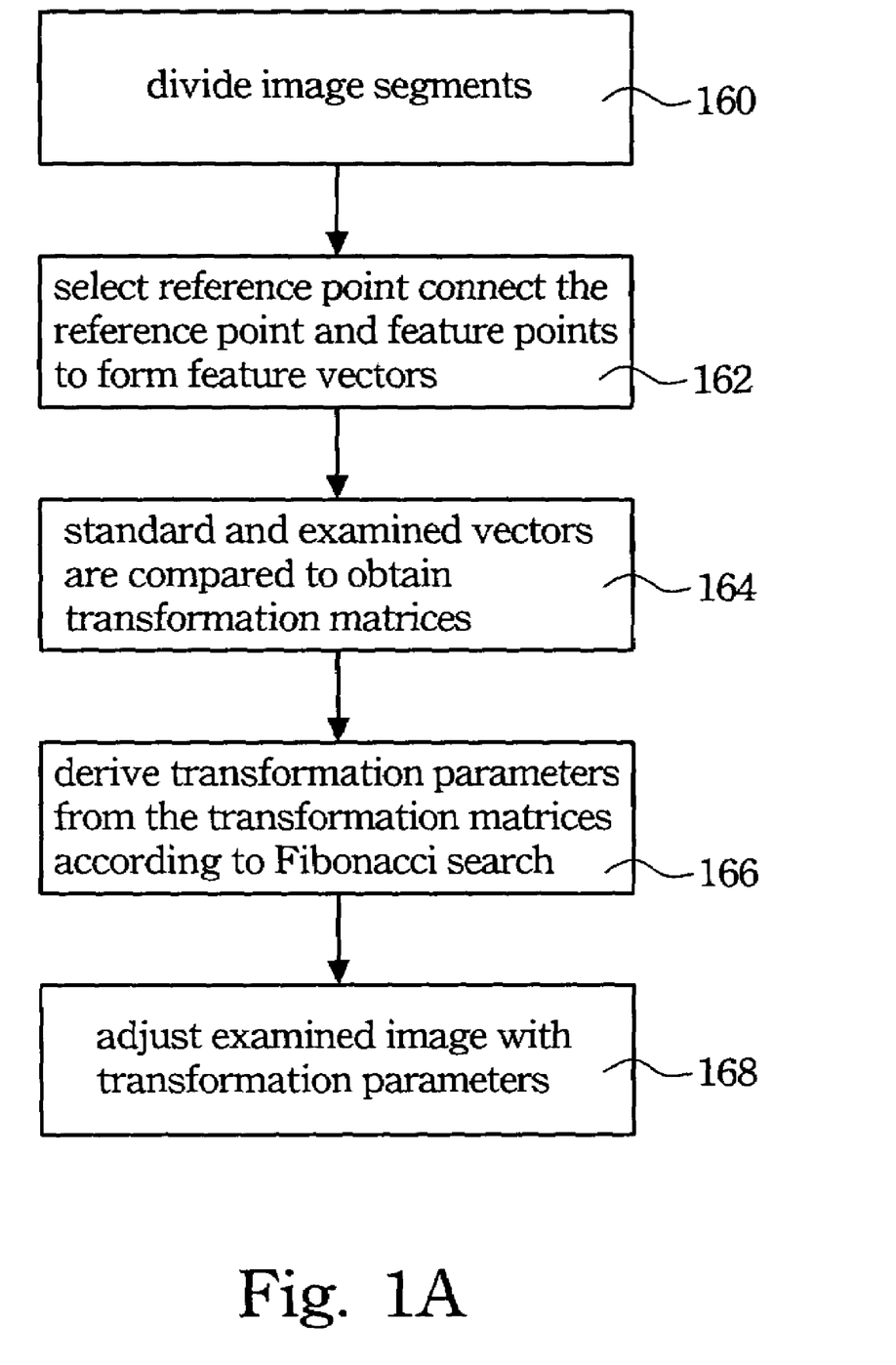
FIG. 1A is a flow chart of one preferred embodiment of the present invention.
Figure 1B:
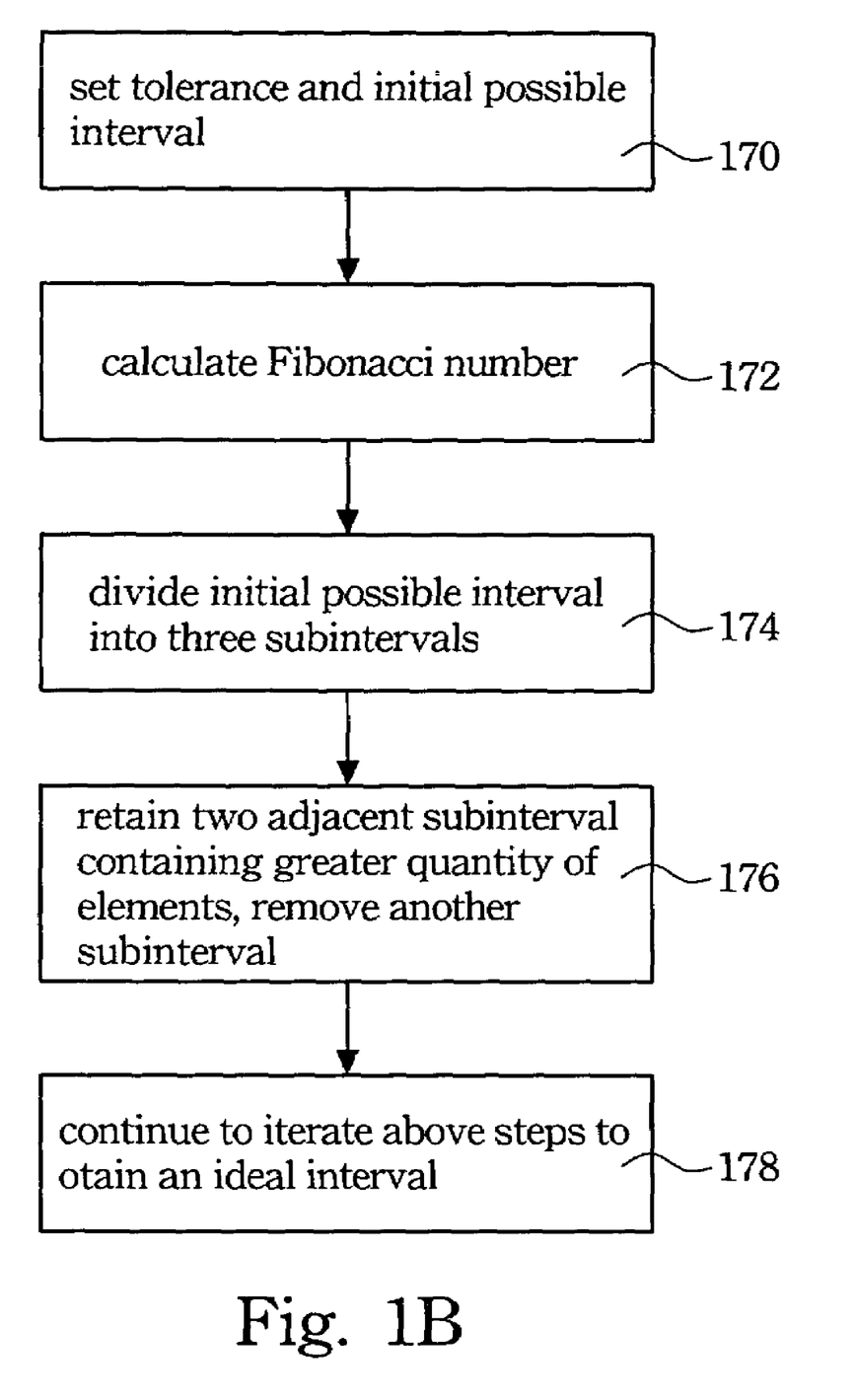
FIG. 1B is a flow chart of a Fibonacci search used in the preferred embodiment.

FIG. 1A is a flow chart of one preferred embodiment of the present invention, and FIG. 1B is a flow chart of a Fibonacci search used in the preferred embodiment. The preferred embodiment provides an image registration method, which can set segments flexibly, to derive transformation parameters between examined and standard images in segments (step 160). In every image segment, feature points and a reference point of the segment are connected to form vectors (step 162). The vectors of the examined and standard image segments are correspondingly compared to obtain transformation parameters for every corresponding vector, and the transformation parameters are saved in transformation matrices, such as scaling, rotation, and two translation transformation matrices (step 164).

The preferred embodiment provides an optimal searching method to derive a most suitable transformation parameter (step 166). First, based on initial possible intervals for every transformation parameter, interval divisions are carried out by a Fibonacci search with a required tolerance (steps 170, 172 and 174), and each subinterval divided from the initial possible intervals is configured with an accumulator. Elements of the transformation matrix are checked one by one, and the count of the accumulator in charge of the subinterval that the element falls into is incremented. After all elements are checked, the subinterval that corresponds to the accumulator having a count smaller than those of other accumulators for other subintervals is removed (step 176). The foregoing interval division step is repeated with the remaining intervals, and the foregoing iteration step is then carried out repeatedly to obtain an ideal interval that fits the required tolerance, i.e. the most suitable transformation parameter (step 178). Finally, the examined image segments are adjusted with their corresponding transformation parameters (step 168).

Figure 2A:
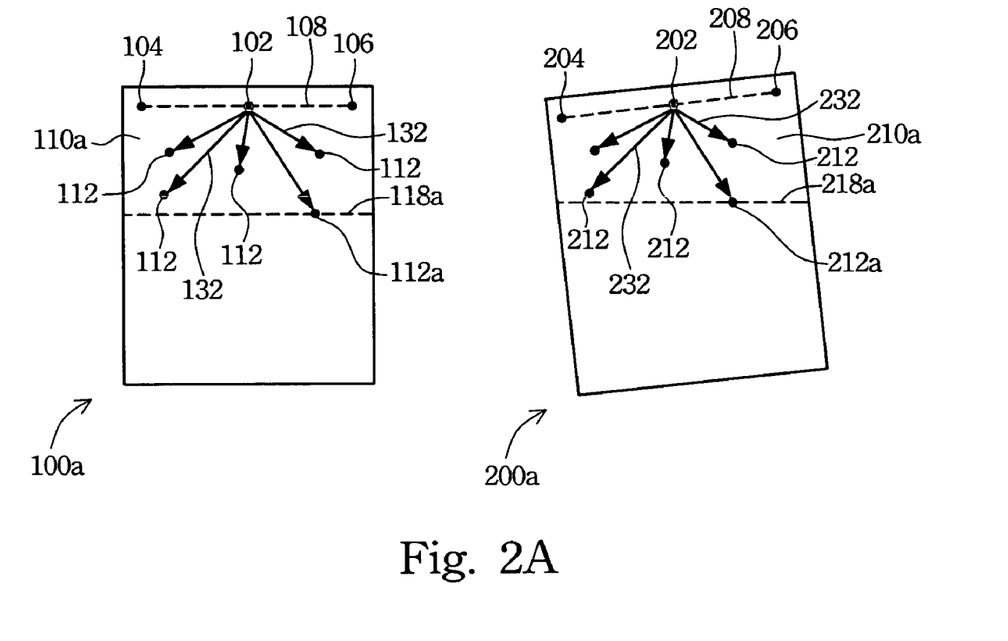
FIG. 2A illustrates a schematic view of one preferred embodiment of the present invention.

FIG. 2A illustrates a schematic view of one preferred embodiment of the present invention, in which a standard image 100*a* is used to register an examined image 200*a*, and the standard image 100*a* is a copper clay laminate or a scanned document of a fax machine. The standard image 100*a* has a plurality of standard feature points 112, and the examined image 200*a* has a plurality of examined feature points 212. The quantities and positions of the feature points 112 and 212 of standard and examined image 100*a* and 200*a* may not be the same. Therefore, the method of the present invention is provided to register the images.

A standard position line 108 is connected between two standard position points 104 and 106 of the standard image 100*a*, and a midpoint of the line 108 is used as a standard reference point 102 of a first image segment of the standard image 100*a*. An examined position line 208 is connected between two examined position points 204 and 206 of the examined image 200*a*, and a midpoint of the line 208 is used as an examined reference point 202 of a first image segment of the examined image 200*a*.

Generally, the position points 104, 106, 204 and 206 can directly exist on the common printed circuit board or the copper clay laminate. Moreover, if the registered object is a scanned document for faxing, when the document is faxed, points that are unobvious to the naked eye, but with proper sizes, can be added on two sides of the scanned document by the fax machine to be the position points as mentioned above.

The standard image 100*a* is divided into a first standard image segment 110*a*, and the examined image 200*a* is divided into a first examined image segment 210*a*. In the preferred embodiment, the segment division refers to the quantities of the standard and examined feature points 112 and 212 to decide positions of final boundaries 118*a* and 218*a* for the first standard and examined image segments 110*a* and 210*a*.

For example, the final boundaries 118*a* and 218*a* of the first standard and examined image segments 110*a* and 210*a* are decided by the positions of the 500th standard and examined feature points 112*a* and 212*a*, respectively. The quantities of the feature points contained in the first standard and examined image segments 110 and 220 are fixed, thus preventing lengthening the computation time due to too many feature points in a certain image segment.

Figure 2B:
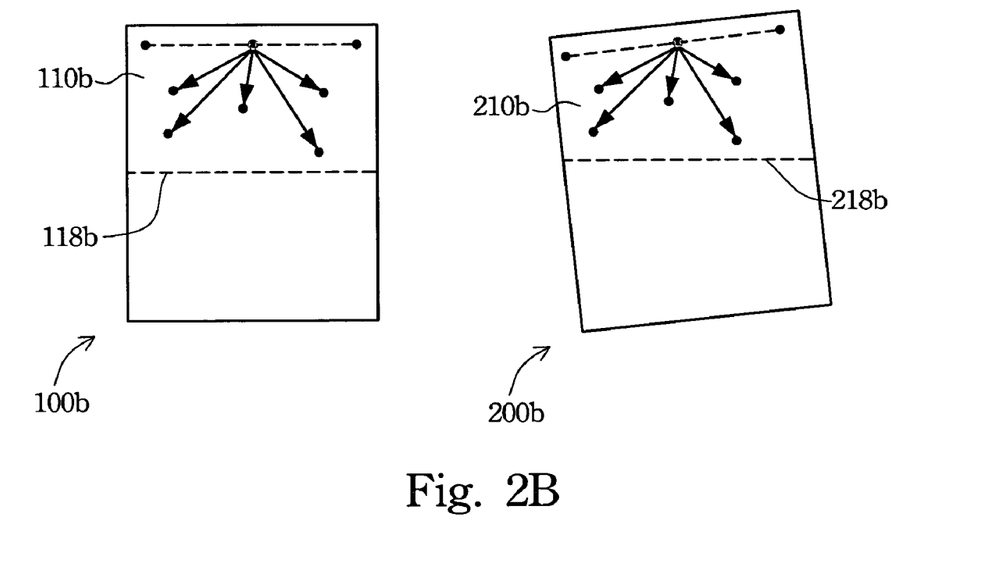
FIG. 2B illustrates a schematic view of another embodiment of the present invention.

FIG. 2B illustrates a schematic view of another embodiment of the present invention. In the preferred embodiment, if an examined image 200*b* is very similar to a standard image 100*b*, in which the quantities of the feature points are almost equal, the first standard and examined image segments 110*b* and 210*b* can be divided by distances. In other words, the preferred embodiment decides positions of final boundaries 118*b* and 218*b* for the first standard and examined image segments 110*b* and 210*b* by distances. This approach for dividing segments is easier and also can be used in the present invention.

The standard feature points 112 and the standard reference point 102 in the first standard image segment are connected to form a plurality of standard vectors 132 of the first standard image segment. The examined feature points 212 and the examined reference point 202 in the first standard image segment are connected to form a plurality of examined vectors 232 of the first standard image segment.

Figure 3:
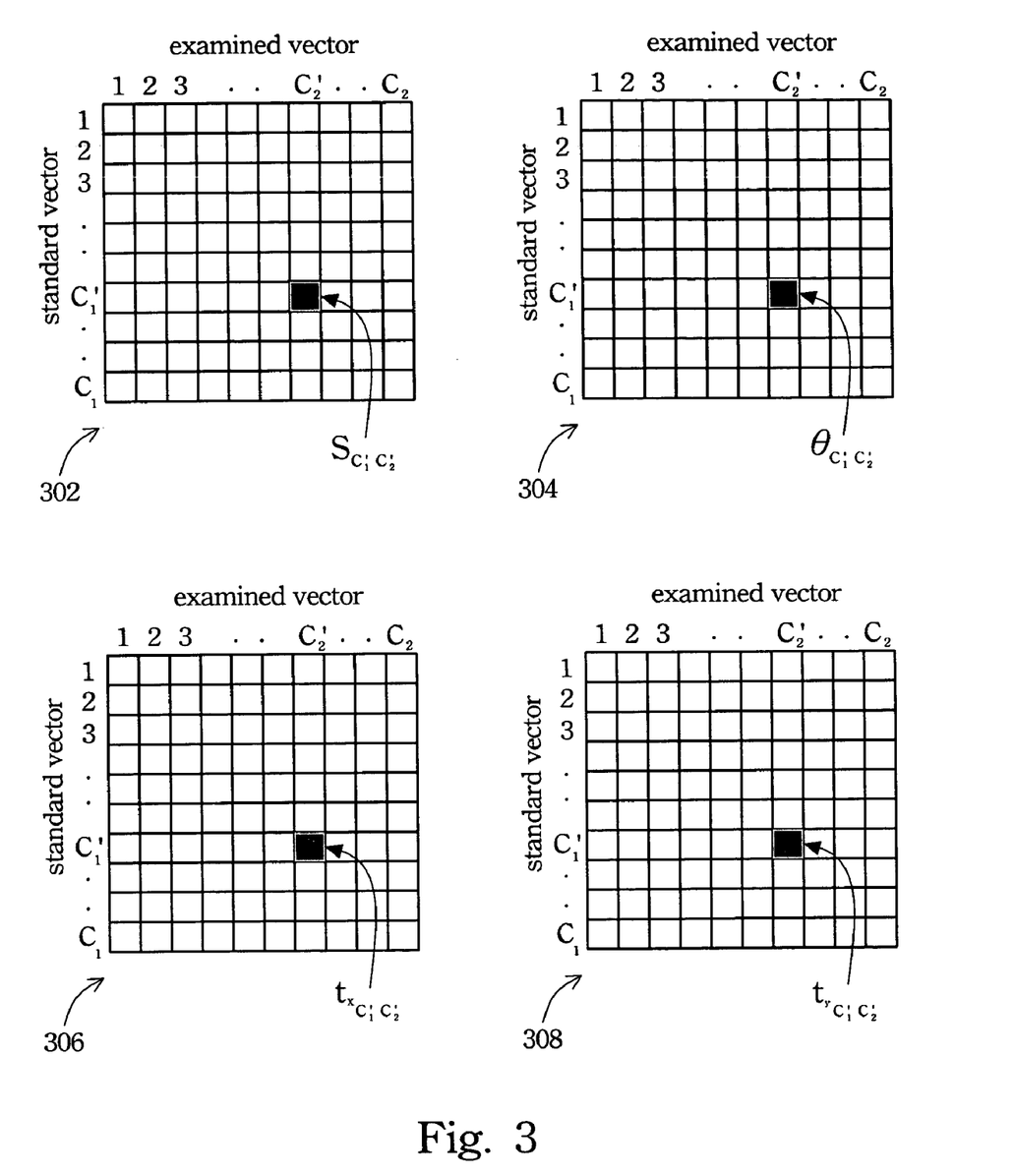
FIG. 3 is a schematic view of transformation matrices of one preferred embodiment of the present invention.

The standard vectors 132 of the first standard image segment and the examined vectors 232 of the first examined image segment are compared to obtain the transformation parameters of the scaling (s), rotation ($\theta$) and translation ($t_x$, $t_y$) in two directions. The four types of transformation parameters are respectively saved in four transformation matrices, as illustrated in FIG. 3. FIG. 3 is a schematic view of transformation matrices of one preferred embodiment of the present invention. The four transformation matrices of the first image segments include a scaling transformation matrix 302, a rotation transformation matrix 304, a first translation transformation matrix 306 and a second translation transformation matrix 308.

Coordinates of the longitudinal and transverse axes of each matrix are integers. The longitudinal axis represents series numbers of the standard vectors in the standard image segment, and the transverse axis represents series numbers of the examined vectors in the examined image segment. Due to the present invention processing images in segments, the sizes of its matrices are substantially decreased compared with those of the Voronoi and Delaunay methods, and thus, tremendous memory space is saved and the searching time is greatly decreased.

The invention also provides an optimal searching method to derive the suitable transformation parameters between the two image segments. The following descriptions are made with reference to the scaling transformation parameters to interpret the Fibonacci search used in the present invention. A required tolerance $\delta$ of the scaling transformation parameters is assumed as 0.012, and the most possible variation range of the scaling transformation parameters is assumed between an initial possible interval [0.7, 1.429]. That is, a maximum possible value b of the initial possible interval is 1.429, and a minimum possible value of the initial possible interval is 0.7.

First, a Fibonacci search number is obtained according to an inequality (1) as follows.

$$F_N \geq \frac{b-a}{\delta} \quad (1)$$

The $F_N$ in the inequality (1) is a Fibonacci number, and the definition of the Fibonacci number is:

$$F_0 = F_1 = 1$$

$$F_N = F_{N-1} + F_{N-2} \quad (2)$$

By the above definition, a Fibonacci sequence can be generated, as listed in Table 1.

TABLE 1

The Fibonacci sequence.

| N | 0 | 1 | 2 | 3 | 4 | 5 | 6 | 7 | 8 | 9 | 10 |
|---|---|---|---|---|---|---|---|---|---|---|---|
| $F_N$ | 1 | 1 | 2 | 3 | 5 | 8 | 13 | 21 | 34 | 55 | 89 |

Therefore, when the tolerance δ is 0.012, the corresponding Fibonacci number N is 10.

The Fibonacci search uses the following equations (3), (4) and (5) to determine two experimental points $\alpha_1$ and $\beta_1$ used in the first searching.

$$\varepsilon = \frac{b-a}{F_N} \quad (3)$$

$$\alpha_1 = a + F_{N-1} \cdot \varepsilon \quad (4)$$

$$\beta_1 = b - F_{N-1} \cdot \varepsilon \quad (5)$$

Figure 4A:
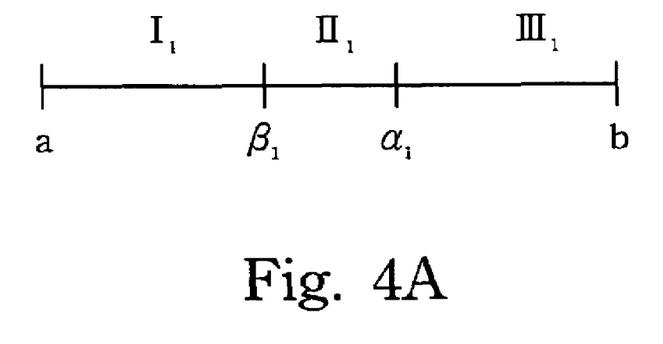
FIG. 4A is a schematic view of the initial possible interval of the preferred embodiment of the present invention.

By the equations (3), (4) and (5), the two experimental points are obtained as $\alpha_1$ equal to 1.151 and $\beta_1$ equal to 0.979 for the first searching in the preferred embodiment. FIG. 4A is a schematic view of the initial possible interval of the preferred embodiment of the present invention. As illustrated in FIG. 4A, the initial possible interval [0.7, 1.429] is divided into three subintervals, such as a first interval $I_1$ [0.7, 0.979], a second interval $II_1$ [0.979, 1.151] and a third interval $III_1$ [1.151, 1.429] by the two experimental points $\alpha_1$ and $\beta_1$.

Scaling elements saved in the scaling transformation matrix 302 of the first image segments are checked one by one, and the quantities of the elements falling into the first interval $I_1$, the second interval $II_1$ and the third interval $III_1$ are calculated, respectively. A sum of the numbers of the elements in the first interval $I_1$ and second interval $II_1$ is compared with a sum of the numbers of the elements in the second interval $II_1$ and third interval $III_1$. Among the intervals $I_1$, $II_1$ and $III_1$, the two adjacent intervals having the greater sum of the numbers of the elements are kept, and the other interval is removed. The two remaining intervals are used as a new possible interval and the foregoing iteration steps are repeated for the new possible interval until obtaining an ideal interval.

A maximum value of the ideal interval finally derived is the optimal transformation parameter of the scaling (s) between the examined image segment and the standard image segment. For other transformation parameters of the rotation (θ) and translation ($t_x$, $t_y$) in two directions, their optimal transformation parameters can be derived from the steps as well as the transformation parameter of the scaling (s).

For example, when the sum of the numbers of the elements falling into the second interval $II_1$ and third interval $III_1$ is greater than the sum of the numbers of the elements falling into the first second $I_1$ and second interval $II_1$, the first interval $I_1$ is removed, and the second interval $II_1$ and third intervals $III_1$ are used as a new possible interval [0.979, 1.429]. The minimum possible value of the new possible interval is 0.979, which is the foregoing experimental point $\beta_1$; the maximum possible value of the new possible interval is 1.429, which is the initial maximum possible value b. Under these new conditions, two experimental points $\alpha_2$ and $\beta_2$ are obtained according to equations (6) and (7).

$$\alpha_2 = \beta_1 + F_{N-2} \cdot \varepsilon \quad (6)$$

$$\beta_2 = b - F_{N-2} \cdot \varepsilon \quad (7)$$

Figure 4B:
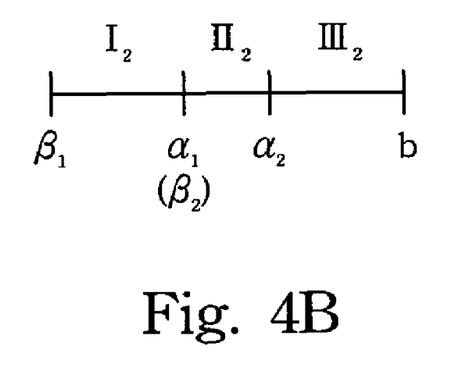
FIG. 4B is a schematic view of the second possible interval of the preferred embodiment of the present invention.

By the equations (6) and (7), the two experimental points are obtained as $\alpha_2$ equal to 1.257 and $\beta_2$ equal to 1.151 for the second searching in the preferred embodiment. FIG. 4B is a schematic view of the second possible interval of the preferred embodiment of the present invention. As illustrated in FIG. 4B, the initial possible interval [0.979, 1.429] is divided into three subintervals, such as a first interval $I_2$ [0.979, 1.151], a second interval $II_2$ [1.151, 1.257] and a third interval $III_2$ [1.257, 1.429] by the two experimental points $\alpha_2$ and $\beta_2$.

In another aspect, when the sum of the numbers of the elements falling into the first interval $I_1$ and second interval $II_1$ is greater than the sum of the numbers of the elements failing into the second interval $II_1$ and third interval $III_1$, the second interval $III_1$ is removed, and the first interval $I_1$ and second interval $II_1$ are used as a new possible interval [0.7, 1.151]. The minimum possible value of the new possible interval is 0.7, which is the initial minimum possible value a; the maximum possible value of the new possible interval is 1.151, which is the foregoing experimental point $\alpha_1$. Under these new conditions, two experimental points $\alpha_2'$ and $\beta_2'$ are obtained according to equations (8) and (9).

$$\alpha'_2 = a + F_{N-2} \cdot \varepsilon \quad (8)$$

$$\beta'_2 = \alpha_1 - F_{N-2} \cdot \varepsilon \quad (9)$$

Figure 4C:
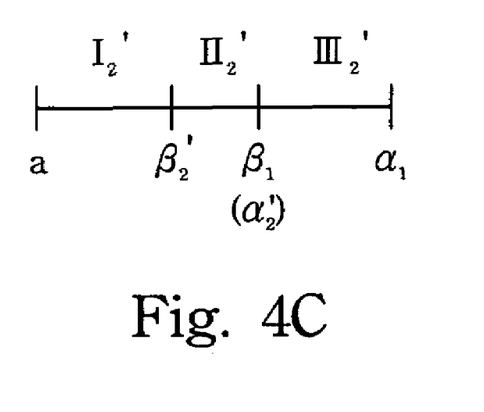
FIG. 4C is a schematic view of the second possible interval of another preferred embodiment of the present invention.

By the equations (8) and (9), the two experimental points are obtained as $\alpha_2'$ equal to 0.979 and $\beta_2'$ equal to 0.872 for the second searching in the preferred embodiment. FIG. 4C is a schematic view of the second possible interval of another preferred embodiment of the present invention. As illustrated in FIG. 4C, the initial possible interval [0.7, 1.151] is divided into three subintervals, such as a first interval $I_{2'}$ [0.7, 0.872], a second interval $II_{2'}$ [0.872, 0.979] and a third interval $III_{2'}$ [0.979, 1.151] by the two experimental points $\alpha_2'$ and $\beta_2'$.

From the foregoing two embodiments, the Fibonacci search used in the present invention is the fastest of the interval searching methods. The advantage of the Fibonacci search is that one of the experimental points of the present searching is one of the experimental points of the former searching. In other words, in every iteration process, the Fibonacci search only needs one new experimental point for dividing the new possible interval into three subintervals. The present invention further provides another improvement of the Fibonacci search by another preferred embodiment in the following description, which is more suitable for multifarious and disorderly data processes, such as the image registration.

Figure 5:
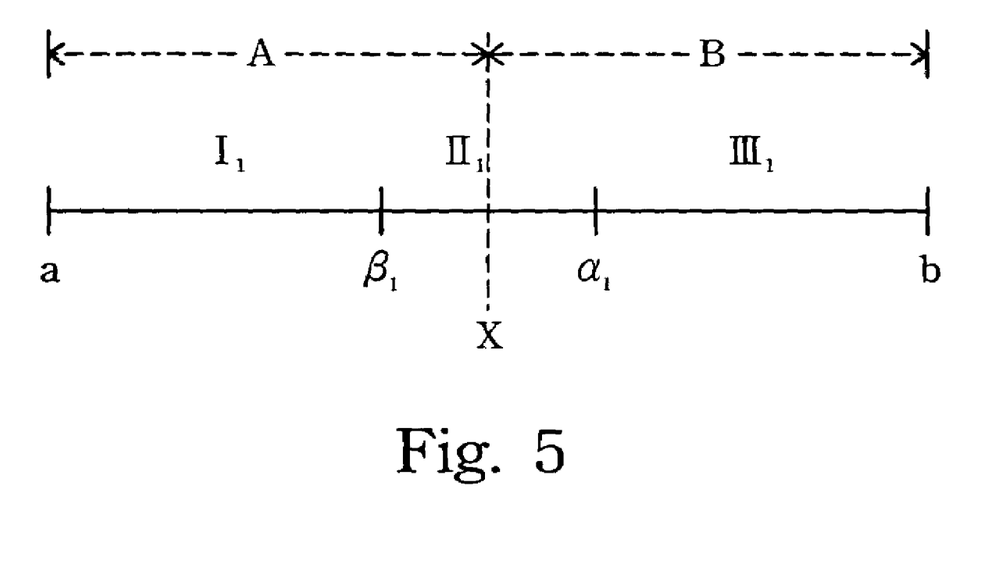
FIG. 5 is a schematic view of a Fibonacci search used in another preferred embodiment of the present invention.

FIG. 5 is a schematic view of another preferred embodiment of the present invention, in which the possible interval illustrated in FIG. 4A is used to interpret the special and improved method for the Fibonacci search in the present invention. In the preferred embodiment, a midpoint X of the initial possible interval, i.e. 1.065, is used as a demarcation point to divide the initial possible interval into a former interval A and a later interval B. The midpoint X of the initial possible interval is also the midpoint of the two experimental points. An accumulator is configured to each of the intervals A and B to count the number of elements of the transformation matrix falling into each interval.

The elements of the transformation matrix are one by one checked for which interval they fall into. If the element falls into the former interval, the count of the accumulator in charge of the former interval is incremented; if the element falls into the later interval, the count of the accumulator in charge of the later interval is incremented. After all elements of the transformation matrix are checked, the counts of the two accumulators for the two intervals are compared.

When the number of the elements falling into the former interval is greater than the number of the elements falling into the later interval, the third interval $III_1$ [1.151, 1.429] is removed, and a combination [0.7, 1.151] of the first interval $I_1$ and the second interval $II_1$ is used as a new possible interval for the next searching. When the number of the elements falling into the later interval is greater than the number of the elements falling into the former interval, the first interval $I_1$ [0.7, 0.979] is removed, and a combination [0.979, 1.429] of the second interval $II_1$ and the third interval $III_1$ is used as a new possible interval for the next searching. The foregoing iteration steps are repeated until obtaining an ideal interval which fits the required tolerance.

It is noticed that, according to other preferred embodiments of the present invention, besides separately deriving each optimal transformation parameters for each of the transformation matrices by the Fibonacci search, the Fibonacci search can be applied on only one of the transformation matrices to derive its corresponding transformation parameter, and then other optimal transformation parameters for other transformation matrices are obtained directly by reference with the relationship of the foregoing optimal transformation parameter and the corresponding elements of the transformation matrix. In some conditions, this method, which only uses the Fibonacci search on a single transformation matrix, can fasten the processing speed of the image registration.

Figure 6A:
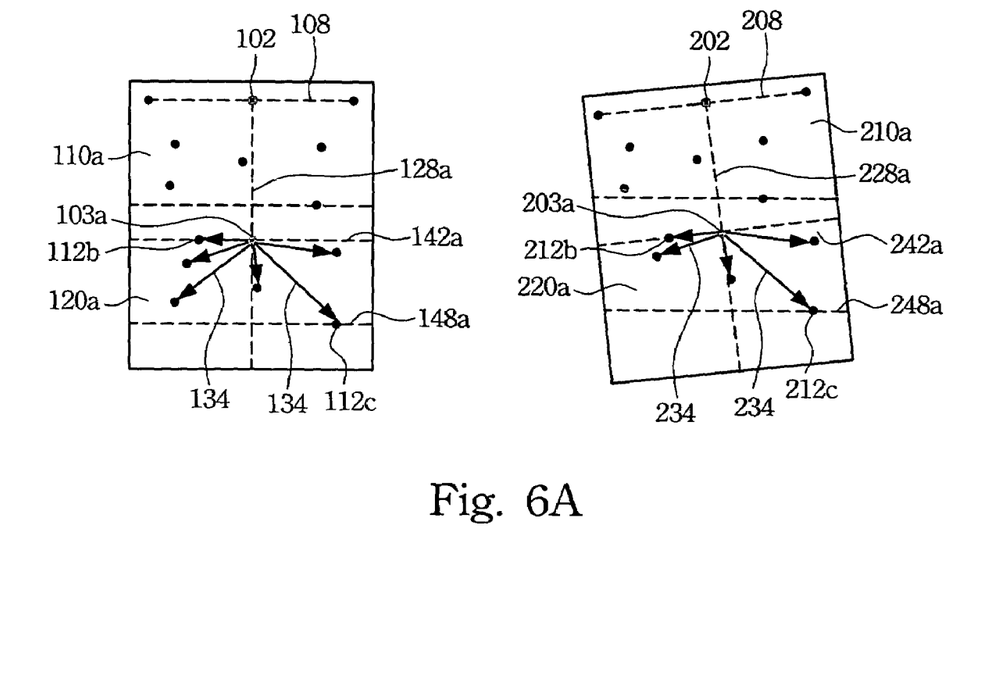
FIG. 6A is a schematic view of one preferred embodiment of the present invention.

When the standard image and the examined image are divided into a plurality of standard image segments and a plurality of examined image segments, the present invention also provides a method to handle it. FIG. 6A is a schematic view of one preferred embodiment of the present invention, which uses FIG. 2A to interpret how to decide the second standard image segment and the second examined image segment by the quantities of the feature points.

As illustrated in FIG. 6A, when the image registrations between the first standard image segment 110a and the first examined image segment 210a are finished, an initial boundary 142a of the second standard image segment 120a is decided according to the standard feature point 112b which is closest to the first standard image segment 110a, and an initial boundary 242a of the second examined image segment 220a is decided according to the standard feature point 212b which is closest to the first standard image segment 210a.

In the preferred embodiment, the initial boundary 142a of the second standard image segment 120a is perpendicular to a perpendicular bisector 128a of the line 108 connected between the two standard position points, and the initial boundary 242a of the second examined image segment 220a is perpendicular to a perpendicular bisector 228a of the line 208 connected between the two examined position points. Moreover, the standard reference point 103a of the second standard image segment 120a is located on the initial boundary 142a of the second standard image segment 120a, and a line connected between the standard reference point 102 of the first standard image segment 110a and the standard reference point 103a of the second standard image segment 120a is perpendicular to the initial boundary 142a of the second standard image segment 120a. The examined reference point 203a of the second standard image segment 220a is located on the initial boundary 242a of the second standard image segment 220a.

As well as the first standard image segment 110a and the first examined image segment 210a illustrated in FIG. 1A, the final boundaries 148a and 248a of the second standard and examined image segments 120a and 220a are decided according to the positions of the 500th standard and examined feature points 112c and 212c.

Then, the steps illustrated in FIGS. 1A and 1B are repeated. The standard vectors 134 of the second standard image segment 120a and the examined vectors 234 of the second examined image segment 220a are compared to obtain the transformation matrices of the scaling, rotation and translations in two directions for the second image segments. The optimal transformation parameters for the second image segments are then derived from the transformation matrices of the second image segments and are used to register the second examined image segment 220a.

Figure 6B:
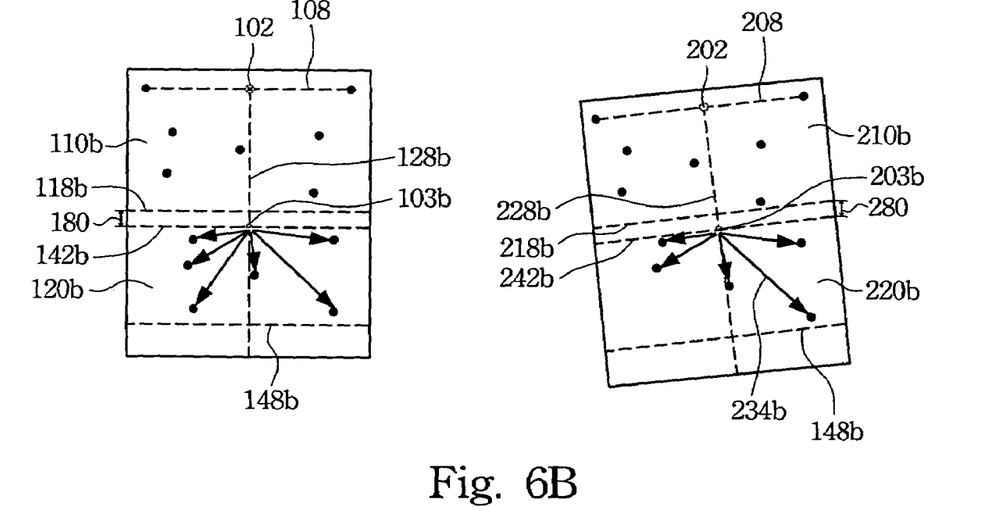
FIG. 6B is a schematic view of one preferred embodiment of the present invention.

FIG. 6B is a schematic view of another preferred embodiment of the present invention, which uses FIG. 2B to interpret how to decide the second standard image segment and the second examined image segment by distances.

As illustrated in FIG. 6B, when the image registrations between the first standard image segment 110b and the first examined image segment 210b are finished, initial boundaries 142b and 242b of the second standard and examined image segments 120b and 220b are decided according to the distances. A predetermined distance 180 is between the initial boundary 142b of the second standard image segment 120b and the final boundary 118b of the first standard image segment 110b. A predetermined distance 280 is between the initial boundary 242b of the second standard image segment 220b and the final boundary 218b of the first standard image segment 210b.

In the preferred embodiment, the initial boundary 142b of the second standard image segment 120b is perpendicular to a perpendicular bisector 128b of the line 108 connected between the two standard position points, and the initial boundary 242b of the second examined image segment 220b is perpendicular to a perpendicular bisector 228b of the line 208 connected between the two examined position points. Moreover, the standard reference point 103b of the second standard image segment 120b is located on the initial boundary 142b of the second standard image segment 120b, and a line connected between the standard reference point 102 of the first standard image segment 110b and the standard reference point 103b of the second standard image segment 120b is perpendicular to the initial boundary 142b of the second standard image segment 120b. The examined reference point 203b of the second standard image segment 220b is located on the initial boundary 242b of the second standard image segment 220b.

As well as the first standard image segment 110b and the first examined image segment 210b illustrated in FIG. 1B, the final boundaries 148b and 248b of the second standard and examined image segments 120b and 220b are decided by distances.

It is noted that, the division methods mentioned above, in which the final boundaries of the first image segments and the second image segments are decided by the quantities of the feature points or the distances, can be used selectively and mixed according to the needs. That is, the image segment divisions are not limited by the foregoing embodiments of which the image segments are decided merely by only one of the two division methods.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A segment based image registration method for registering an examined image with a standard image, the method comprising:
    dividing the standard image into at least one standard image segment, and dividing the examined image into at least one examined image segment, wherein the standard image segment has a plurality of standard feature points, and the examined image segment has a plurality of examined feature points;
    selecting a standard reference point in the standard image segment, and selecting an examined reference point in the examined image segment, wherein the standard feature points and the standard reference point form a plurality of standard vectors, and the examined feature points and the examined reference point form a plurality of examined vectors;
    comparing the examined vectors to the standard vectors to obtain at least one transformation matrix;
    deriving a transformation parameter from the transformation matrix according to a Fibonacci search, wherein the Fibonacci search comprises:
        setting a tolerance and an initial possible interval, wherein two ends of the initial possible interval are a maximum possible value and a minimum possible value;
        obtaining a Fibonacci iteration number according to the tolerance;
        dividing the initial possible interval into a first interval, a second interval and a third interval with a first experimental point and a second experimental point according to the Fibonacci iteration number;
        counting numbers of elements of the transformation matrix falling into the first, second and third intervals;
        comparing a sum of the numbers of the elements falling into the first and second intervals with a sum of the numbers of the elements falling into the second and third intervals, and keeping the two adjacent intervals having the greater sum of the numbers of the elements and removing the other interval; and
        using the two remaining intervals as a new possible interval and repeating the foregoing iteration steps for the new possible interval until obtaining an ideal interval; and
    adjusting the examined image segment with the transformation parameter.

2. The method of claim 1, wherein at least one transformation matrix comprises a scaling transformation matrix, a rotation transformation matrix, a first translation matrix and a second translation matrix.

3. The method of claim 1, wherein the transformation parameter is the experimental point at the maximum value of the ideal interval.

4. The method of claim 1, wherein the Fibonacci search further comprises:
    dividing the initial possible interval into a former interval and a later interval with a midpoint of the first experimental point and the second experimental point, wherein the former interval comprises the first interval and one portion of the second interval, and the later interval comprises another portion of the second interval and the third interval;
    comparing numbers of the elements falling into the former interval and the later interval;
    removing the third interval when the number of the elements falling into the former interval is greater than the number of the elements falling into the later interval; and
    removing the first interval when the number of the elements falling into the later interval is greater than the number of the elements falling into the former interval.

5. The method of claim 4, wherein the numbers of the elements are counted with an accumulator.

6. The method of claim 1, wherein the standard image segment is divided by a quantity of the standard feature points, and the examined image segment is divided by a quantity of the examined feature points.

7. The method of claim 1, wherein the standard image segment and the examined image segment are divided by distances.

8. The method of claim 1, wherein when the standard image has two standard position points and the examined image has two examined position points, a midpoint of a line connected between the two standard position points is defined as the standard reference point, and a midpoint of a line connected between the two examined position points is defined as the examined reference point.

9. The method of claim 1, wherein the standard image comprises a first standard image segment and a second standard image segment, and the examined image comprises a first examined image segment and a second examined image segment.

10. The method of claim 9, wherein the method further comprises:
    deciding an initial boundary of the second standard image segment according to one of the standard feature points in the second standard image segment closest to the first standard image segment; and
    deciding an initial boundary of the second examined image segment according to one of the examined feature points in the second examined image segment closest to the first examined image segment.

11. The method of claim 10, wherein when the standard image has two standard position points and the examined image has two examined position points, the initial boundary of the second standard image segment is parallel to a line connected between the two standard position points, and the initial boundary of the second examined image segment is parallel to a line connected between the two examined position points.

12. The method of claim 10, wherein the standard reference point of the second standard image segment is located on the initial boundary of the second standard image segment, and a line connected between the standard reference points of the first and second standard image segments is perpendicular to an initial boundary of the first standard image segment, and the examined reference point of the second examined image segment is located on the initial boundary of the second examined image segment, and a line connected between the examined reference points of the first and second examined image segments is perpendicular to an initial boundary of the first examined image segment.

13. The method of claim 9, wherein a first predetermined distance is between an initial boundary of the second standard image segment and a final boundary of the first standard image segment, and a second predetermined distance is between an initial boundary of the second examined image segment and a final boundary of the first examined image segment.

14. The method of claim 13, wherein when the standard image has two standard position points and the examined image has two examined position points, the initial boundary of the second standard image segment is parallel to a line connected between the two standard position points, and the initial boundary of the second examined image segment is parallel to a line connected between the two examined position points.

15. The method of claim 13, wherein the standard reference point of the second standard image segment is located on the initial boundary of the second standard image segment, and a line connected between the standard reference points of the first and second standard image segments is perpendicular to an initial boundary of the first standard image segment, and the examined reference point of the second examined image segment is located on the initial boundary of the second examined image segment, and a line connected between the examined reference points of the first and second examined image segments is perpendicular to an initial boundary of the first examined image segment.

* * * * *